United States Patent [19]

Weitzenhof et al.

[11] Patent Number: 4,623,162
[45] Date of Patent: Nov. 18, 1986

[54] DUAL TRAILING ARM VEHICLE SUSPENSION SYSTEM

[75] Inventors: David A. Weitzenhof, Bath; Charles F. Sayre, Akron, both of Ohio

[73] Assignee: The Firestone Tire & Rubber Company, Akron, Ohio

[21] Appl. No.: 665,481

[22] Filed: Oct. 29, 1984

[51] Int. Cl.[4] .............................................. B60G 19/00
[52] U.S. Cl. .................................. 280/687; 267/63 R; 267/153
[58] Field of Search ............... 280/687, 104, 676, 677; 267/153, 63 R

[56] References Cited

U.S. PATENT DOCUMENTS

| | | | |
|---|---|---|---|
| 2,361,496 | 10/1944 | Pointer | 267/20 |
| 2,410,747 | 11/1946 | Reid | 280/104.5 |
| 2,493,024 | 1/1950 | Pointer | 280/104.5 |
| 2,742,301 | 4/1956 | Pointer | 280/104.5 |
| 2,743,939 | 5/1956 | Reid et al. | 280/104.5 |
| 3,410,573 | 11/1968 | Hickman | 280/687 |
| 3,528,680 | 9/1970 | Nelson | 280/124 |
| 3,539,198 | 11/1970 | Hickman | 280/104.5 |
| 3,545,787 | 12/1970 | Miller | 280/687 |
| 3,749,417 | 7/1973 | Hickman | 280/687 |
| 3,768,827 | 10/1973 | Hickman | 280/104.5 |
| 3,892,398 | 7/1975 | Marsh | 267/153 |

OTHER PUBLICATIONS

SAE Technical Paper authored by J. E. Gieck et al-"-The 'Marsh Mellow' Spring", presented Feb. 22-26, 1982.
Article from Truck & Off-Highway Industries, May/-Jun. 1982, pp. 38-39.
Firestone Industrial Products Company brochure entitled "Replace Off-Highway Suspension Troubles with Marsh Mellow Struts", by Firestone.
Firestone Industrial Products Company brochure entitled "96% Availability From Our Marsh Mellow—Equipped Dump Trucks Reduces Operating Costs for Amherst".

Primary Examiner—Richard A. Bertsch
Attorney, Agent, or Firm—R. Brietkrenz

[57] ABSTRACT

An improved vehicle suspension system for use on axles of trailers, trucks, and the like. A pair of wheels are individually rotatably mounted on stub axles attached to a pair of trailing arms which are connected to and extend radially rearwardly from a pair of pivot sleeves. The sleeves are pivotally mounted on brackets connected to the vehicle frame. A pair of spaced levers are attached to and extend radially outwardly from each of the pivot sleeves and rotate in unison with the trailing arms. An annular elastomer spring is located between a pair of metal end plates which are pivotally mounted on and located between the spaced levers. One of the end plates is connected to the lever by a hollow shaft and another shaft is connected to the other end plate and extends through the elastomer spring and into the hollow shaft to maintain the spring in axial alignment. The elastomer spring, in combination with the dual trailing arm and associated lever mounting arrangement, provides a balanced force on the vehicle tires and trailing arms during vehicle braking and upon the tires encountering road obstructions as well as during static conditions.

17 Claims, 10 Drawing Figures

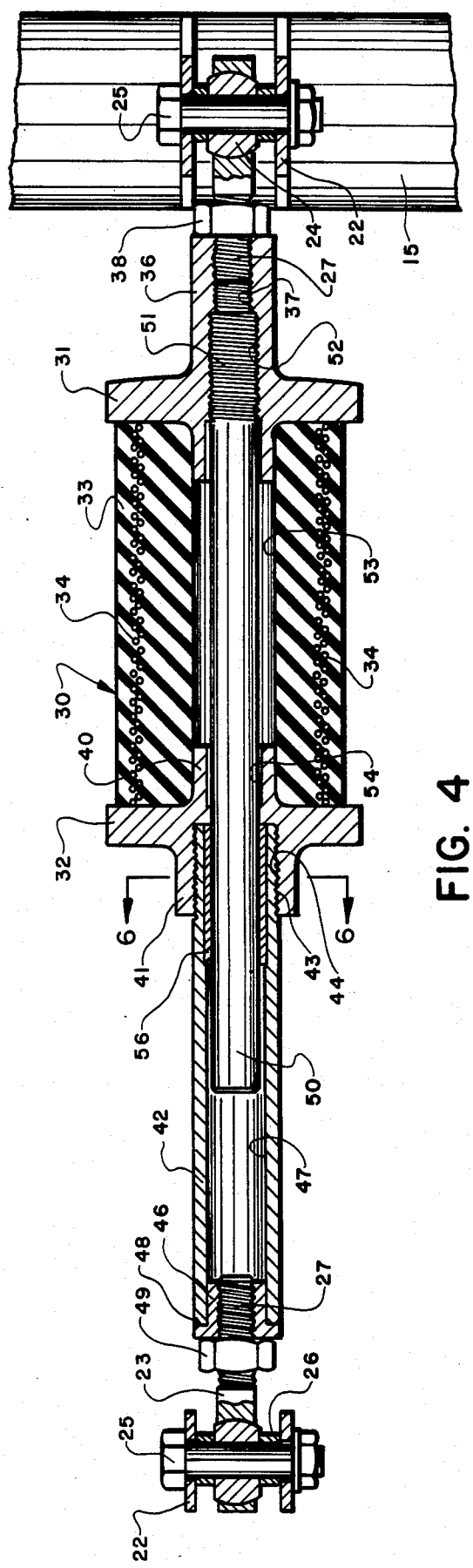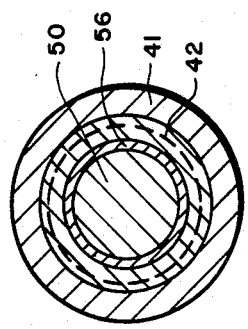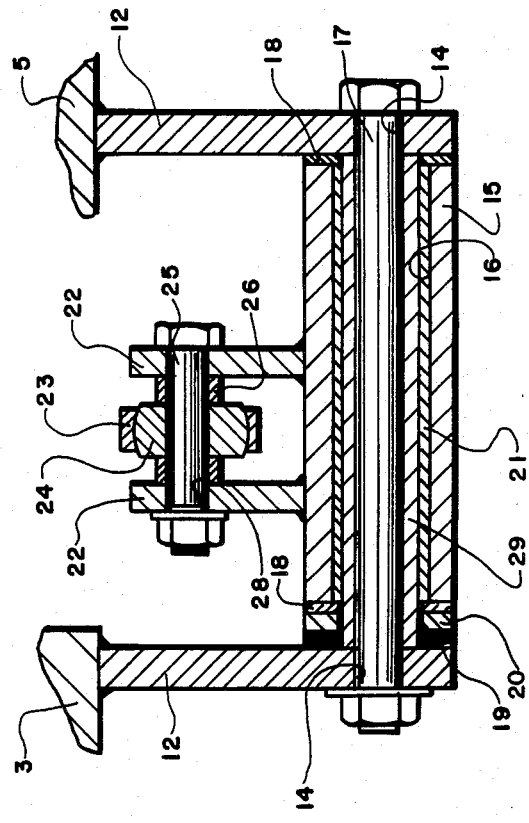

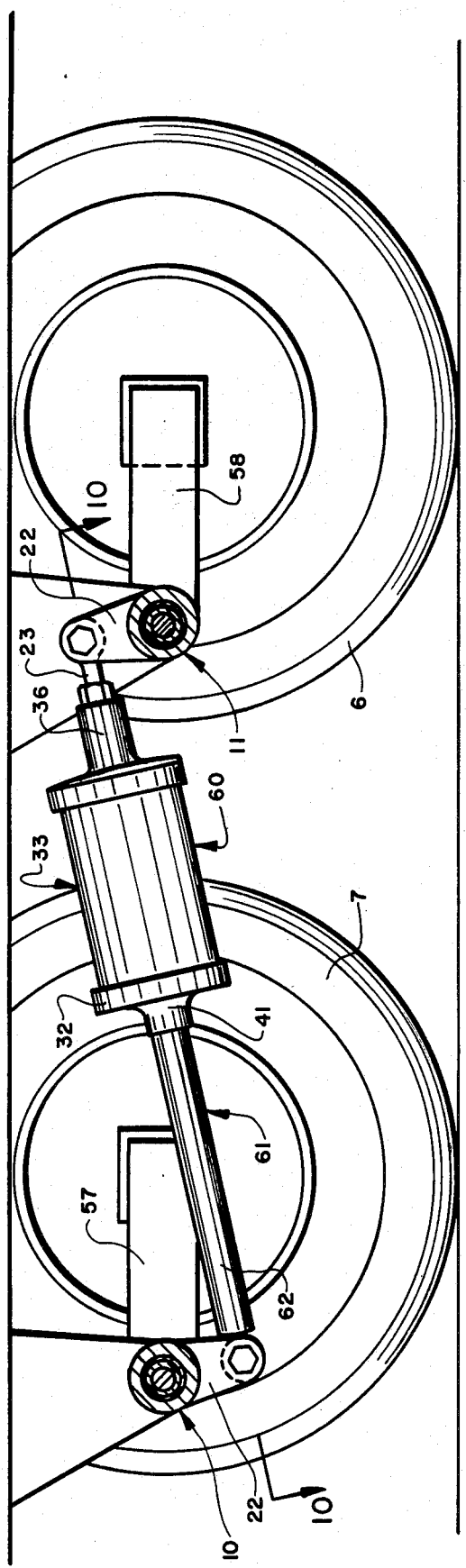
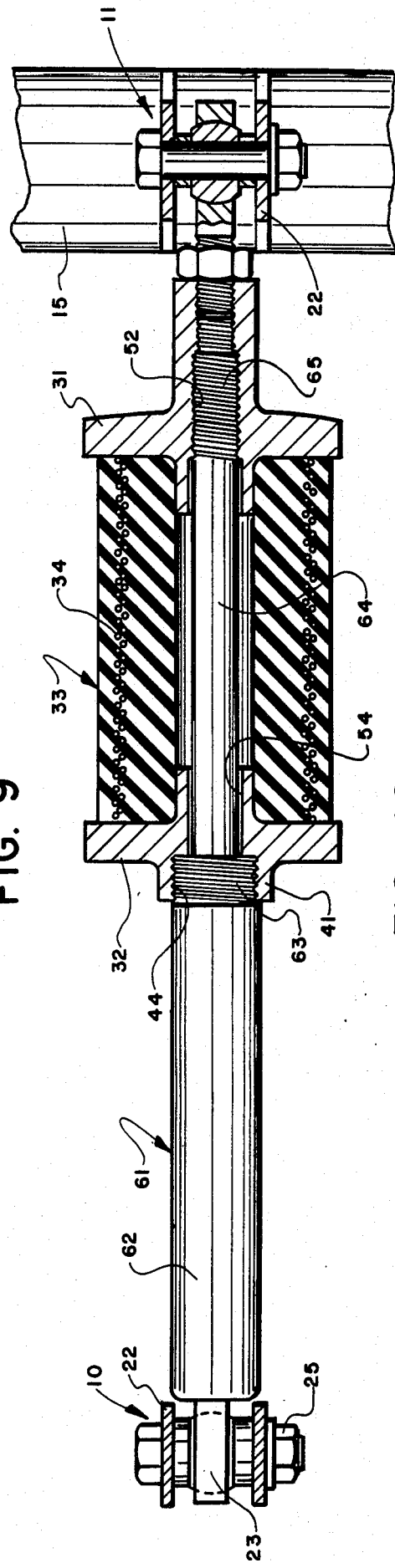
FIG. 9
FIG. 10

DUAL TRAILING ARM VEHICLE SUSPENSION SYSTEM

TECHNICAL FIELD

The invention relates to a suspension system for vehicles and is preferably applicable to non-driven axles mounted on trailers or trucks. More particularly, the invention relates to such a vehicle suspension system having a dual trailing arm arrangement in conjunction with an elastomer spring for a pair of wheels located on the same side of the vehicle for equalizing the forces exerted on the wheels and trailing arms particularly during braking and upon experiencing variations in the road surface.

BACKGROUND ART

Numerous types of suspension systems and arrangements have been divised to provide a smoother ride for vehicles including vehicles having non-driven axles of the type mounted on trailers, trucks, recreational vehicles and the like. Suspension systems also have been devised for use with vehicles having such non-driven axles which include a pair of separate axles on each side of the vehicle with a single wheel or pair of wheels being rotatably mounted on the stub shaft of each axle. These axle pairs have been interconnected by various suspension systems in an attempt to equalize load exerted on the individual tires.

Heretofore, these axle pairs and associated wheels were interconnected by suspension systems utilizing a trailing arm and leading arm arrangement separately or together with a walking beam. These types of suspensions result in an unbalanced force being exerted on the forward tire which causes that tire to dig into the roadway and causes the rear tire to lift from the pavement during braking. This trailing-leading arm suspension arrangement causes a "chatter" effect on the rear tires during braking resulting in chatter tire tread marks on the pavement and excess vibration on the trailer frame and cab. Also, the excessive force applied to the leading arm of the suspension system can seriously damage the arm and axle.

These prior suspension systems also have incorporated into the leading and trailing arm arrangements and connecting walking beams an intervening steel coil or leaf spring or elastomer spring member to increase the smoothness of the ride. Examples of these prior suspension systems are shown in U.S. Pat. Nos. 2,361,496; 2,410,747; 2,493,024; 2,742,301; 2,743,939; 3,410,573; 3,528,680; and 3,539,198.

Some of these problems have been eliminated by providing the suspension system with a dual trailing arm arrangement in which both of the wheels are rotatably mounted on the end of trailing arms which are pivotally mounted on the vehicle frame forward of the wheels. Also, the wheel mounting arms are interconnected through levers and an intervening rubber spring located between the extended ends of the levers to provide for a smoother ride. U.S. Pat. Nos. 3,749,417 and 3,768,827 are examples of such suspension systems and are believed to be the closest prior art to the suspension system of our invention.

Although the dual trailing arm suspension systems of the type shown in these two patents do overcome some of the difficulties with the prior trailing and leading arm type of suspension systems, they are limited in certain aspects. The length of the levers which are connected to the trailing arm pivot assemblies and are engaged with the elastomer spring must be equal to at least one-half the distance between the wheel axles. This requirement seriously limits the versatility that can be obtained by the suspension system since the ratio between the lengths of the levers and trailing arms and the included angle therebetween cannot be easily adjusted. This prevents obtaining various suspension characteristics, which can be achieved by varying these parameters, for matching the suspension system to the desired ride characteristics and load carrying capability of the vehicle on which the suspension system will be mounted. Also, the axial length of the rubber spring placed between the overlapping lever ends is limited since this length must be maintained relatively short to avoid interference with the vehicle frame at one end and low ground clearance at the other end.

Although some of these prior suspension systems do perform satisfactorily in many situations, they do not provide the desired versatility and balanced force distribution during braking and upon contacting road obstructions. Accordingly, the need has existed for an improved suspension system which uses a pair of trailing arms in combination with an elastomer spring to provide a smooth ride and to distribute the braking forces and road vibrations equally onto both tires that support the trailer or the vehicle body.

DISCLOSURE OF THE INVENTION

Objectives of the invention include providing an improved suspension system in which two or more freely rotatable wheels, preferably mounted on non-driven axles, are mounted on each side of the vehicle at the extended ends of a pair of independent trailing arms which are pivotally suspended beneath the vehicle frame and interconnected through an elastomer spring. Another object is to provide such a suspension system in which the elastomer spring is pivotally mounted by adjustable supports on the ends of levers which are attached to the trailing arm pivot means so that the levers will move in relationship to the trailing arms for transmitting forces to the spring; and in which the annular relationship between each of the trailing arms and its associated lever as well as the lengths of the trailing arms and levers can be varied to achieve various suspension characteristics depending upon the particular type of vehicle on which the suspension system is to be mounted.

A further objective of the invention is to provide such a suspension system in which the axial length of the elastomer spring may be varied without materially affecting the ground clearance of the suspension system and possible interference with the vehicle frame; and in which the length of the spring mounting levers are unaffected by the spacing of the vehicle wheels on which the suspension system is mounted. Another objective is to provide such an improved suspension system which achieves the stated objectives and overcomes the problems existing in prior systems in a relatively simple, inexpensive, and rugged construction which minimizes maintenance problems; and in which shock absorbing means can be placed in series with the elastomer spring to provide a more controlled ride for certain types of vehicles.

These objectives and advantages are obtained by the improved vehicle suspension system which is adapted to be interposed between a vehicle frame and a pair of wheels arranged one in advance of the other on each side of the vehicle, the general nature of which may be stated as including a pair of axles on a side of the vehicle frame for independently rotatably mounting each of the wheels; a pair of trailing arms, each of said arms being attached at one end to a respective axle and extending forwardly from the axle; a pair of pivot means mounted on the vehicle frame and connected to other ends of the trailing arms for pivotally mounting the arms and associated wheels with respect to the vehicle frame; lever means attached to and extending outwardly from each of the pivot means for pivotal movement with said pivot means in relationship to movement of the trailing arms, with the length of said lever means being independent of the spacing between the pair of axles; and elastomer spring means extending between and pivotally mounted on the levers for absorbing and balancing the forces exerted on the wheels particularly during braking and when encountering variations in the road surface.

BRIEF DESCRIPTION OF THE DRAWINGS

A preferred embodiment of the invention, illustrative of the best mode in which applicants have contemplated applying the principles, is set forth in the following description and is shown in the drawings and is set forth in the appended claims.

FIG. 4 is an enlarged fragmentary sectional view taken on line 4—4, FIG. 3;

FIG. 5 is an enlarged fragmentary sectional view taken on line 5—5, FIG. 3;

FIG. 6 is an enlarged sectional view taken on line 6—6, FIG. 4;

FIG. 9 is a fragmentary side elevational view similar to FIG. 3 showing a modified form of the improved suspension system; and FIG. 10 is an enlarged fragmentary sectional view taken on line 10—10, FIG. 9.

Similar numerals refer to similar parts throughout the drawings.

BEST MODE FOR CARRYING OUT THE INVENTION

Figure 1:
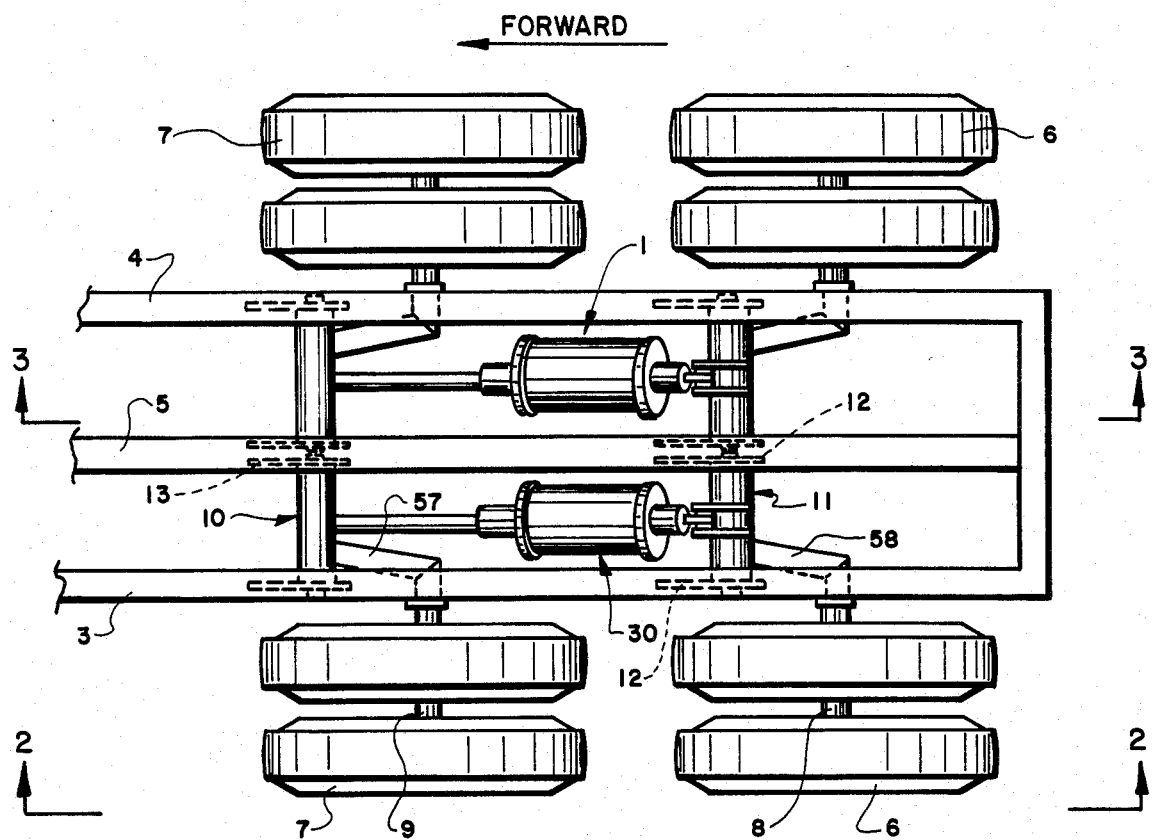
FIG. 1 is a fragmentary top plan view of a vehicle frame having a pair of the improved suspension systems mounted thereon.

The improved dual trailing arm vehicle suspension system is indicated generally at 1, and a pair of such systems are shown in FIG. 1 mounted on the rear portion of a trailer frame 2. Improved suspension system 1 is intended for use particularly on non-driven axles of trailers, trucks, recreational vehicles, and the like, although with some modification it could also be used on driven axles. Trailer frame 2 as shown in FIG. 1 is representative of one type of vehicle body on which improved suspension system 1 is adapted to be mounted. Trailer frame 2 includes a pair of outer frame members 3 and 4 and an intermediate frame member 5 all of which extend longitudinally along the length of the vehicle frame.

Two pairs of wheels indicated at 6 and 7 are shown mounted on stub axles 8 and 9, respectively, on each side of the frame 2. Suspension system 1 is adaptable for use on axles having only a single wheel mounted thereon instead of a pair of wheels as shown in FIG. 1. Two of the improved suspension systems are shown in FIG. 1, one for each set of wheels on each side of the vehicle. Also, the two suspension systems shown in FIG. 1 are similar to each other therefore, only one is described in detail and shown in the drawings.

Improved suspension system 1 is shown particularly in FIGS. 3-6. Suspension system 1 includes a pair of pivot assemblies indicated generally at 10 and 11, which are suspended beneath frame members pairs 3 and 5 by spaced pairs of downwardly extending mounting brackets 12 and 13. Brackets 12 and 13 preferably are welded to longitudinal frame members 3 and 5 as shown in FIG. 1 and project downwardly therefrom. Other types of pivot assembly mounting bracket arrangements may be utilized other than those shown in the drawings and described above without affecting the concept of the invention.

Pivot assemblies 10 and 11 are similar to each other therefore only assembly 11 is described in detail and shown in the drawings (FIG. 5). Assembly 11 includes a hollow cylindrical sleeve 15 having a central bore 16. Sleeve 15 is pivotally mounted on a sleeve bushing 21 which is telescopically mounted on a spacer sleeve 29. A mounting bolt 17 extends through the bore of spacer sleeve 29 and a pair of aligned holes 14 is formed in brackets 12 for clamping sleeve 29 tightly between the brackets. A pair of thrust washers 18 are mounted at the outer ends of sleeve 15 on spacer sleeve 29 adjacent mounting bracket 12 and an annular spacer 20. A Belleville spring 19 is telescopically mounted on spacer sleeve 29 between spacer 20 and bracket 12. This arrangement enables pivot sleeve 15 to be pivotally mounted with respect to bolt 17 between mounting brackets 12. End seals (not shown) also may be mounted on the ends of the pivot assemblies to prevent dirt and other contaiminants from entering the assembly and effecting the pivotal movement of sleeve 15.

A pair of spaced parallel levers 22 are welded to each pivot sleeve 15 and extend radially outwardly therefrom for pivotally mounting spherical rod end 23 therebetween. Rod ends 23 have a spherical bearing 24 which pivotally mounts each rod end 23 on a bolt 25 which extends through a pair of aligned holes 28 formed in levers 22. Each spherical rod end 23 also has a threaded shaft 27 opposite of bearing 24. Rod ends 23 are maintained midway between levers 22 by a pair of spacer sleeves 26. Levers 22 and the pivoted mounting arrangement of rod ends 23 are similar for both pivot assemblies 10 and 11 except that the levers on pivot assemblies 10 extend downwardly from sleeve 15 whereas they extend upwardly from sleeve 15 of assembly 11. The lever pairs are generally parallel to each other in a static condition as shown in FIG. 3.

Figure 3:
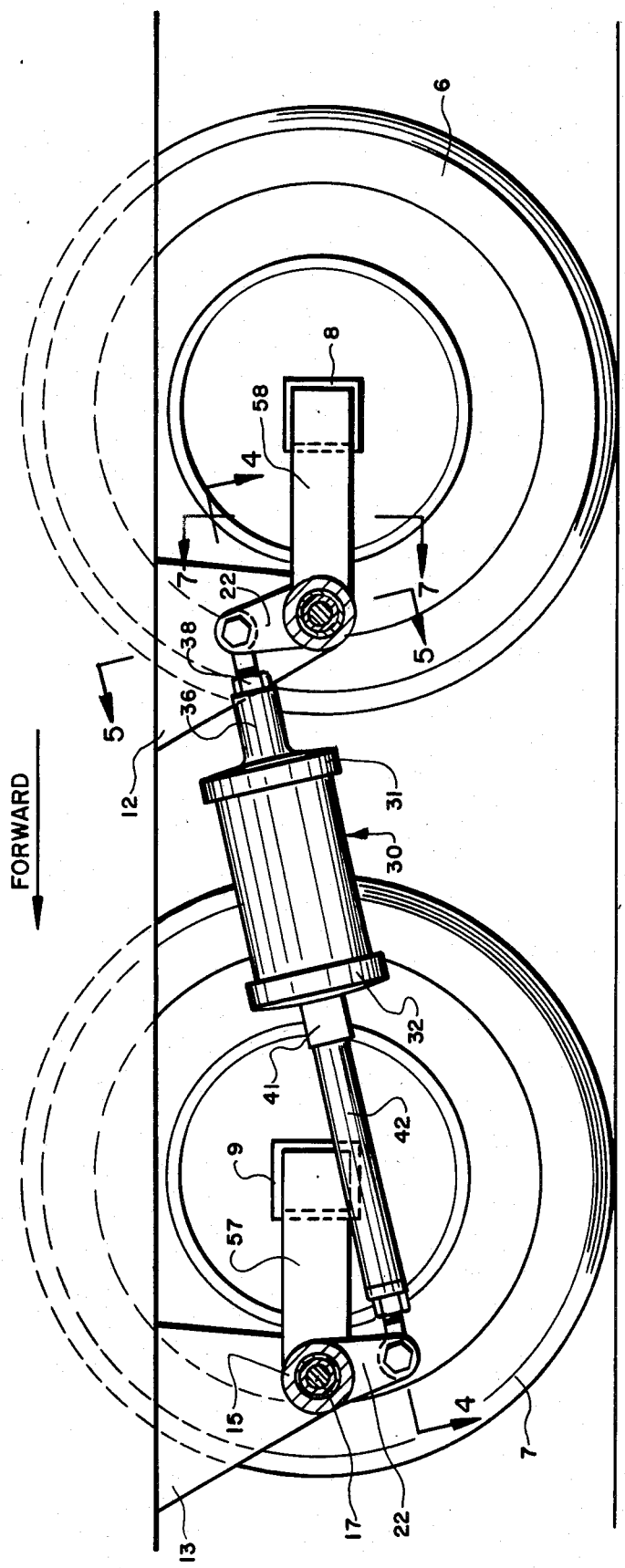
FIG. 3 is an enlarged fragmentary sectional view taken on line 3—3, FIG. 1.

In accordance with one of the main features of the invention, an elastomer spring assembly indicated generally at 30, is located between and is operatively connected to spaced lever pairs 22 (FIGS. 3 and 4). Spring assembly 30 includes a pair of spaced disc-shaped metal end plates 31 and 32 which are abutted against the ends of an annular elastomer spring 33. Spring 33 preferably is of the type shown in U.S. Pat. No. 3,892,398 and is a hollow annular shaped rubber member with a plurality of nylon cords 34 embedded therein in a similar manner as in bias-tire construction.

End plate 31 includes an inwardly extending annular boss 35 and an outwardly extending annular boss 36. Outer boss 36 is formed with a threaded bore 37 in which the threaded end 27 of spherical rod end 23 of pivot assembly 11 is engaged and secured by a jam nut 38. End plate 32 also is formed with an inwardly extending annular boss 40 and an outer annular boss 41.

A hollow shaft 42 having an externally threaded end 43 is engaged within threaded bore 44 of outer boss 41. An insert 46 is telescopically mounted within the outer end of shaft bore 47 and secured therein by welds 48. Threaded end 27 of spherical rod 23 of pivot assembly 10 is engaged within the threaded bore of insert 46 and locked therein by another jam nut 49.

A preferably solid, inner shaft 50 is connected by a threaded end 51 within an enlarged threaded bore portion 52 of end plate 31. Shaft 50 extends through aligned bore 53 of elastomer spring 33, smooth hollow bore 54 of end plate boss 40, and the larger threaded bore 44 of outer boss 41 and into interior 47 of hollow shaft 42 as shown in FIG. 4. A bearing sleeve 56 is telescopically mounted within interior 47 of shaft 42 to provide a smooth sliding engagement with shaft 50. Shaft 50 maintains the components of spring assembly 30 in axial alignment preventing any bowing of elastomer spring 33 and of end plates 31 and 32.

Referring to FIG. 3, a pair of trailing arms 57 and 58 are welded to pivot sleeves 15 of pivot assemblies 10 and 11 and extend outwardly therefrom as shown particularly in FIGS. 1 and 3. Trailing arms 57 and 58 form a variable included angle with respect to levers 22 depending upon the particular application in which the improved suspension system is used. Stub axles 8 and 9 are mounted on the outer ends of arms 58 and 57, respectively, and extend outwardly therefrom generally parallel with pivot sleeves 15 as shown in FIG. 1. Arms 57 and 58 may extend outwardly from sleeves 15 in an angular relationship as shown in FIG. 1 or in a perpendicular direction therefrom without effecting the concept of the invention. Trailing arms 57 and 58 are attached rigidly to sleeve 15 so as to rotate in unison with the sleeves and levers 22.

Figure 8:
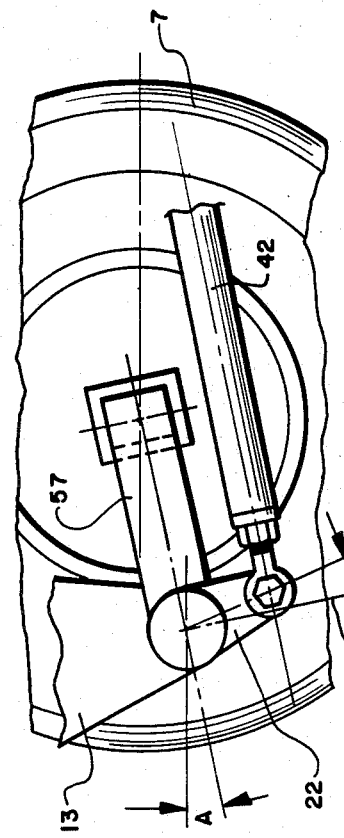
FIG. 8 is a fragmentary diagrammatic view showing the angular relationship between the trailing arm and spring mounting levers of the improved suspension system.
Figure 7:
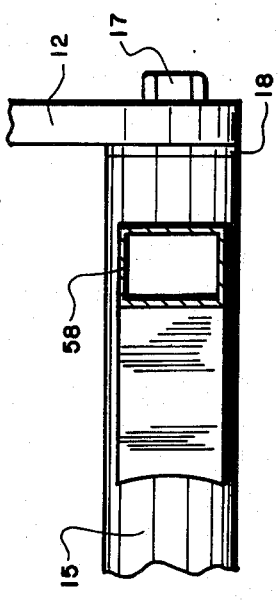
FIG. 7 is a fragmentary sectional view taken on line 7—7, FIG. 3.

The particular angular relationship between the trailing arms, levers and spring mounting member is shown in FIG. 8. The angle of the trailing arm with respect to the horizontal, indicated at A, preferably will remain equal to the angle formed between an imaginary line 55 perpendicular to the axial centerline of the spring assembly and the centerline extending through the lever. These angles may be varied with respect to each other at static condition during the design process depending upon the ride characteristics desired to be obtained by the suspension system for a particular vehicle application.

Also, the lengths of the pairs of levers 22 need not be equal as shown in the drawings. For certain applications, the length of one lever pair may be different from that of the other lever pair. The longer the lever pair with respect to the other lever pair greater will be the load carrying capacity of the axle connected to the longer lever pair. Thus, it may be desirable for one axle of a tandem axle arrangement to carry more of the load than the other axle. This is easily achieved by lengthening the length of the associated lever pair. The lengths of the trailing arms preferably will remain equal to each other even if the lengths of the levers differ with respect to each other.

The use of elastomer spring 33 provides a variable rate spring having stiffness which increases as the load increases and which provides improved load compensation compared to that of a steel spring with considerably less weight. For the same stiffness and load supporting capabilities, a steel spring would weigh considerably more than elastomer spring 33. Also, the length of trailing arms 57 and 58 generally will be between 2 and 5 times as long as the length of levers 22. The particular ratio between these two members will be dependent upon the particular weight and configuration of the vehicle on which the improved suspension system is mounted. Furthermore, in accordance with one of the main features and advantages of the improved suspension system over the prior art is the ability to change the lengths of levers 22 and arms 57–58 to achieve various suspension characteristics without being limited by the spacing between the pair of wheels. This is possible due to the above described mounting arrangement of the spring with respect to levers 22 and the trailing arms and the length ratio of the arms to the levers.

Figure 2:
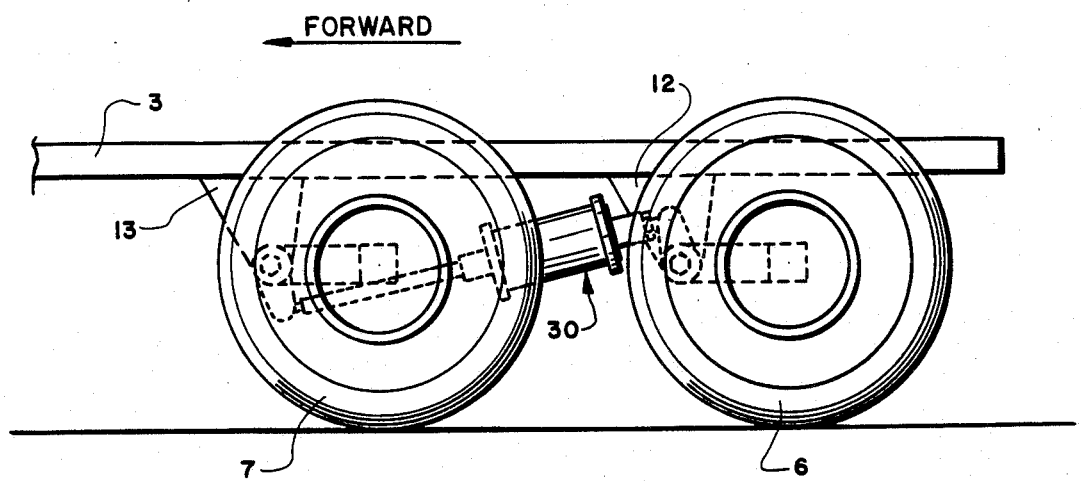
FIG. 2 is a side elevational view looking in the direction of arrows 2—2, FIG. 1.

The forward direction of movement of the vehicle is shown by arrows in FIGS. 1–3. The improved suspension system equalizes the forces that are exerted on the wheels and also on the wheel mounting arms 57 and 58 particularly during braking and upon the wheels encountering obstructions in the road surface such as chuckholes, curbings or the like. For example, assume that the forward wheel 7 strikes a raised obstruction in the road surface causing the wheel to move upwardly which will rotate trailing arm 57 and associated levers 22 in a counterclockwise direction. This movement will compress and increase the load on elastomer spring 33 absorbing much of the shock as well as tending to rotate strut arm 58 and its associated levers 22 in a clockwise direction helping to balance the load. During braking, loading on the forward and rearward tires remains equal due to the identical trailing arm and lever geometry for each wheel.

A modified form of the improved suspension system is indicated generally at 60, and is shown in FIGS. 9 and 10. Modified suspension system 60 includes the same pivotal mounting assemblies 10 and 11, levers 22, trailing arms 57–58, elastomer spring configuration 33, and end plates 31 and 32 as in suspension system 1 described above. The main modification of suspension system 60 is the use of a usual type of hydraulic or gas-pressurized hydraulic shock absorber indicated generally at 61. Spherical rod end 23 is secured to one end of cylindrical housing 62. The other end of housing 62 is threaded at 63 and is engaged with threaded bore 44 of end plate 32. The shock absorber piston rod 64 extends from cylindrical housing 62 through bores 44 and 54 of end plate 32 and has a threaded end 65 which is engaged with threaded bore 52 of end plate 31.

This modified suspension system provides the same advantages as system 1, that is, equal load distribution on the tires during static conditions as well as during vehicle braking and upon the wheels encountering road obstructions. In addition, shock absorber 61 provides damping for the suspension system oscillations occuring during vehicle operation to provide a more controlled ride for the vehicle. Modified suspension system 60 preferably will be used on vehicles requiring a smoother, more controlled ride, such as a recreational type vehicle in contrast to a usual tractor-pulled trailer or other cargo carrying trailer.

Accordingly, improved suspension systems 1 and 60 provide an arrangement which eliminates many of the problems encountered with prior suspension systems used for tandem wheel and axle arrangements by achieving balanced loading on the dual trailing arms and associated tires during static conditions as well as during braking and when the tires encounter an obstruction in the road surface. This increases tire life and reduces possible damage to the trailing arms, and in particular eliminates damage to the front leading arms as occurs in prior suspension systems.

Also, the improved suspension system is extremely compact and is located generally on the same horizontal plane as are the trailing wheel-mounting arms. Therefore in certain type vehicles, such as recreational vehicles, this provides for a lower vehicle body without affecting the suspension mounting arrangement, enabling increased head room to be obtained within the recreational vehicle without increased external height. Also, the improved suspension system uses readily available components which are sturdy and durable and therefore less susceptible to maintenance problems, and which achieves the stated objectives of the invention in a relatively simple and inexpensive manner.

It will be readily appreciated by one skilled in the art that the instant invention may be employed with more than two axles on each side of the vehicle by using an upper and lower pair of levers on the intermediate axles with the upper pair of levers being connected to the forward spring assembly and the lower pair of levers being connected to the rearward spring assembly. Of course, in the preferred embodiment, these two levers would be half the length as the levers on the end pivot assemblies.

Accordingly, the improved vehicle suspension system is simplified, provides an effective, safe, inexpensive, and efficient system which achieves all the enumerated objectives, provides for eliminating difficulties encountered with prior systems and devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is not limited to the exact details shown or described.

Having now described the features, discoveries, and principles of the invention, the manner in which the improved dual trailing arm vehicle suspension system is constructed and used, the characteristics of the system, and the advantageous, new and useful results obtained; the new and useful structures, devices, elements, arrangements, parts, and combinations, are set forth in the appended claims.

What is claimed is:

1. A vehicle suspension system adapted to be interposed between a vehicle frame and at least two wheels arranged one in advance of the other on a side of said vehicle frame; said suspension system including:
   (a) at least two axles on a side of said vehicle frame for independently rotatably mounting each of said wheels;
   (b) at least two trailing arms, each of said arms being attached at one end to a respective axle and extending forwardly from the axle wherein the number of said trailing arms does not exceed the number of axles;
   (c) at least two pivot means mounted on said vehicle frame and connected to the other end of said trailing arms for pivotally mounting said vehicle frame wherein the number of said pivot means does not exceed the number of axles;
   (d) lever means attached to and extending outwardly from each of said pivot means for pivotal movement with said pivot means means in relationship to movement of said trailing arms, with the length of said lever means being independent of the spacing between said axles; and
   (e) elastomer spring means extending between and pivotally mounted on said lever means for absorbing and balancing the forces exerted on said wheels particularly during braking and when encountering variations in the road surface.

2. The vehicle suspension system defined in claim 1 in which the length of the trailing arms is two to five times as great as the length of the lever means.

3. The vehicle suspension system defined in claim 1 in which the pivot means includes a sleeve pivotally mounted on the vehicle frame; and in which the lever means includes a lever rigidly attached at one end to the sleeve and pivotally connected at another end to the elastomer spring means.

4. The vehicle suspension system defined in claim 3 in which the levers extend in generally diametrically opposite directions with respect to each other from their respective sleeves.

5. The vehicle suspension system defined in claim 4 in which the lengths of the levers are equal to each other.

6. The vehicle suspension system defined in claim 1 in which the pivot means includes a shaft pivotally mounted to the vehicle frame; and in which the lever means includes an extension rigidly attached at one end to the trailing arm and pivotally connected at the other end to the elastomer spring means.

7. The vehicle suspension system defined in claim 6 in which the effective angle of the lever means is generally diametrically opposite with respect to each other from the respective shafts.

8. The vehicle suspension system defined in claim 7 in which the effective lengths of the lever means are equal to each other.

9. The vehicle suspension system defined in claim 1 in which the elastomer spring means includes a pair of end plates and cylindrically-shaped elastomer spring formed with a hollow interior which is abutted against and extends axially between said end plates.

10. The vehicle suspension system defined in claim 9 in which the annular-shaped elastomer spring includes a plurality of embedded wrapped nylon strands.

11. The vehicle suspension system defined in claim 9 in which each of the end plates of the elastomer spring means has a boss extending outwardly from its center and is formed with an internally threaded bore; in which a spherical rod end is threadably engaged in one of the bosses and is pivotally mounted on its respective lever means; in which a hollow shaft is threadably engaged in the other of the bosses and is pivotally mounted on its respective lever means by another spherical rod end; and in which an inner shaft is slidably telescopically mounted within the hollow shaft and extends through the bore of the end plate which is connected to the hollow shaft and through the hollow interior of the elastomer spring and is connected to said other end plate to provide a sliding guide to maintain the axial stability of the elastomer spring.

12. The vehicle suspension system defined in claim 9 in which a fluid controlled shock absorber is connected in series with the elastomer spring.

13. The vehicle suspension system defined in claim 12 in which the shock absorber includes a cylindrical housing and a piston rod; in which the cylindrical housing is pivotally connected at one end to one of the lever means and is connected at its other end to one of the end plates; and in which the piston rod extends through an opening formed in said one end plate and through the hollow interior of the elastomer spring and is connected to the other end of said end plates.

14. The vehicle suspension system defined in claim 9 in which at least one of the end plates is formed with central opening; in which a hollow outer shaft is pivotally mounted on one of the lever means and is connected to said one end plate in alignment with the central opening of said plate; and in which an inner shaft is connected to the other end plate and extends through the interior of the annular-shaped elastomer spring and into the interior of the outer shaft to maintain the elastomer spring in axial alignment.

15. The vehicle suspension system defined in claim 14 in which a bearing sleeve is telescopically mounted between a portion of the inner and outer shafts to provide a smooth sliding engagement therebetween.

16. The vehicle suspension system defined in claim 14 in which a spherical rod end is pivotally mounted on each of the lever means; in which one of said rod ends is attached to the other one of the end plates; and in which the other spherical rod end is connected to the other end of the hollow outer shaft.

17. The vehicle suspension system defined in claim 14 in which the other end plate is formed with a threaded bore that extends into the interior of the annular-shaped elastomer spring; and in which the inner shaft is threadably engaged with said threaded bore.

* * * * *